(12) United States Patent
Takayanagi et al.

(10) Patent No.: US 6,283,039 B1
(45) Date of Patent: Sep. 4, 2001

(54) CONVEYING SYSTEM USING LINEAR MOTOR

(75) Inventors: Shinichi Takayanagi, Miyota-machi; Morimasa Kajioka, Saitama-ken, both of (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/359,116

(22) Filed: Jul. 23, 1999

(30) Foreign Application Priority Data

Dec. 26, 1998 (JP) .................................................. 10-376691

(51) Int. Cl.[7] .................................................. B60L 15/00
(52) U.S. Cl. .................................................. 104/295; 104/292
(58) Field of Search .................................. 104/88.01, 88.02, 104/88.03, 287, 290, 292, 295; 414/793.3; 246/122 R, 122 A, 167 A, 182 R, 186, 187 R, 187 B; 318/135; 191/10; 198/690.1

(56) References Cited

U.S. PATENT DOCUMENTS

| 4,652,800 | * | 3/1987 | Fukuwatari | 318/135 |
|---|---|---|---|---|
| 4,665,349 | * | 5/1987 | Matsuo | 318/135 |
| 4,690,066 | * | 9/1987 | Morishita et al. | 104/282 |
| 4,718,621 | * | 1/1988 | Horimouchi et al. | 246/122 |
| 4,800,818 | * | 1/1989 | Kawaguchi et al. | 104/292 |
| 5,251,741 |   | 10/1993 | Morishita et al. . | |
| 6,118,245 | * | 9/2000 | Sienz et al. | 318/687 |

FOREIGN PATENT DOCUMENTS 0 400 663    12/1990   (EP) .

* cited by examiner

Primary Examiner—Mark T. Le
(74) Attorney, Agent, or Firm—Venable; Robert J. Frank; Gabor J. Kelemen

(57) ABSTRACT

An inexpensive conveying system using a linear motor permits accurate stop positioning and controls generation of dust. The conveying system has a unit including a passive moving assembly and a plurality of sets of fixed coils to perform sending, non-energization travel, receiving, and positioning. The conveying and positioning unit is formed by the passive moving assembly composed of a permanent magnet and a linear sensor scale, and a fixed assembly having coils opposed to the moving assembly and sending and receiving sensor heads for detecting the position of the liner scale of the moving assembly. To achieve lower cost, the coils of the fixed assembly are provided only at a sending station and a receiving station, no additional coil being disposed therebetween.

9 Claims, 4 Drawing Sheets

$Z_1$: ACCELERATION ZONE
$Z_2$: NON-ENERGIZATION TRAVEL ZONE
$Z_3$: SERVO DRIVE ZONE

COIL CONNECTION DIAGRAM
(THREE-PHASE COIL)

CONVEYING SYSTEM USING LINEAR MOTOR

BACKGROUND OF THE INVENTION

1. Field of the Invention

The present invention relates to a conveying system that uses a linear motor for conveying works, assembly components, or other articles to be conveyed.

2. Description of the Related Art

Conveying apparatuses have been extensively used that employ rollers or belts to carry works, assembly components, or other articles to be conveyed. Especially in the case of a conveying apparatus that employs a belt, in order to stop only a particular article in transfer at a predetermined position, the article has to be forcibly restrained, inevitably producing friction between the belt and the article. Further, the accuracy of positioning at the stop point is not very high.

In recent years, linear motor type conveying systems have been proposed and used as the conveying systems for clean rooms, nuclear power stations, physical distribution, etc. A linear induction motor is capable of carrying considerably heavy articles and it is therefore being used as a typical motor used for conveyance. The linear induction motors, however, are considered unsuited for applications that require accurate positioning at stop points.

The conventional conveying systems employing belts or rollers have difficulties in the aspect of the control of dust, carrying speed, maintenance, service life, and positioning control. The linear induction motor type is also disadvantageous in positioning control. The linear motors that allow the braking characteristics thereof to be adjusted have been requiring power be fed to a moving unit thereof, so that the moving unit is likely to produce dust.

SUMMARY OF THE INVENTION

Accordingly, it is an object of the present invention to provide a conveying system employing a linear motor that permits accurate stop positioning.

It is another object of the present invention to provide a conveying system employing a linear motor that has a passive moving assembly to minimize dust produced.

To achieve the above objects, according to one aspect of the present invention, there is provided a conveying system using a linear motor, comprising a passive moving assembly of a linear motor, which is loaded with an article to be conveyed, a scale provided on the moving assembly, a rail for guiding the moving assembly, a sending drive coil disposed at a sending station associated with the rail, a receiving drive coil disposed at a receiving station associated with the rail, which is positioned away from the sending station, a contactless sensor which is disposed at least at the receiving station and which detects the scale, drivers for driving the sending and receiving drive coils, and control means to which information regarding the moving assembly from the sensor is connected, and which drives the respective drivers to accelerate and send the moving assembly, then to stop at a predetermined position at the receiving station following non-energization travel.

The moving assembly has a permanent magnet, and said linear motor can be a linear DC motor.

A combination of the scale and the contactless sensor may be a combination of a linear scale and a photoelectric sensor, or a combination of a magnetic scale and a magnetic sensor or other positioning sensor.

The control means is configure to cause the driver to send the moving assembly at a predetermined sending speed that matches a load of the moving assembly and the length of a non-energized travel passage.

The control means reads the linear scale by the sensor after the moving assembly is received at the receiving station to detect the speed of the moving assembly, compares the detected speed with a reference receiving speed, and corrects the speed of the moving assembly so as to position and stop the moving assembly at a predetermined position. The sending station and the receiving station are provided with the same capability and can be interchangeably operated under the control by the control means.

A plurality of the sending and receiving drive coils are disposed to construct an assembly line. The moving assembly can be intermittently moved for positioning after the moving assembly is received and stopped at the receiving station. The moving assembly is returned from the receiving station to the sending station.

DESCRIPTION OF THE PREFERRED EMBODIMENT

Figure 1:
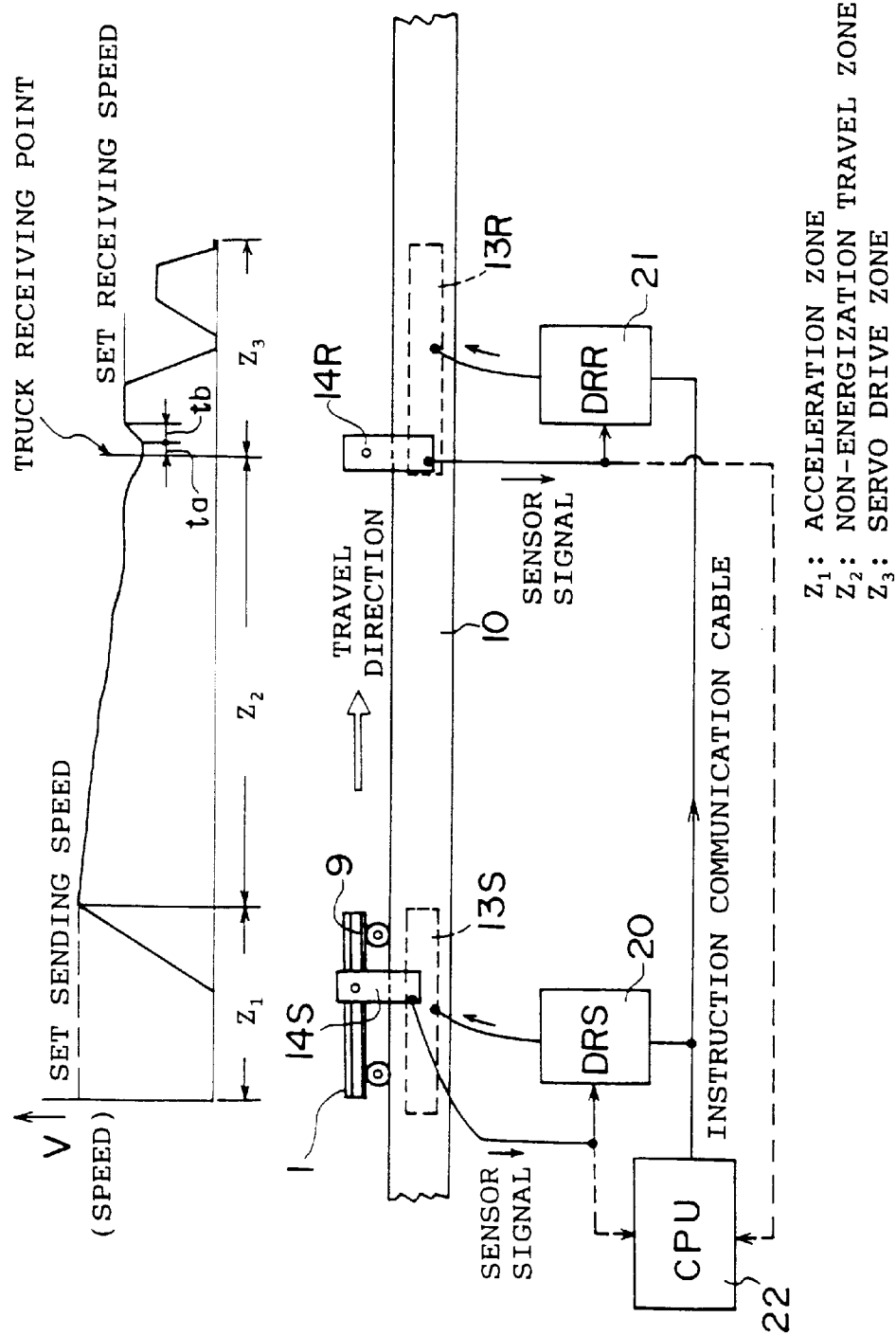
FIG. 1 includes a block diagram showing an embodiment of a conveying system in accordance with the present invention and a graph for explaining the operation thereof.
Figure 2:
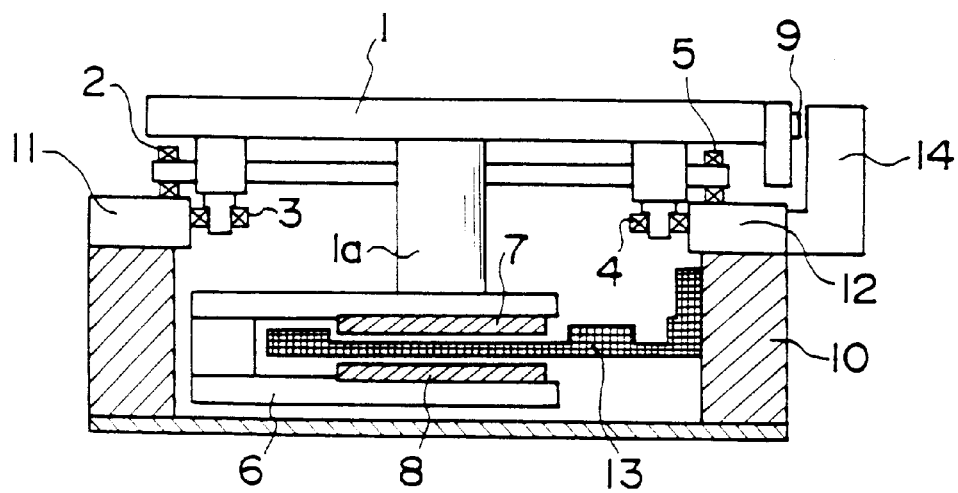
FIG. 2 is a side sectional view (a sectional view observed orthogonally in relation to a transit direction) showing the configuration of an embodiment of a linear motor used with the system in accordance with the present invention.
Figure 5:
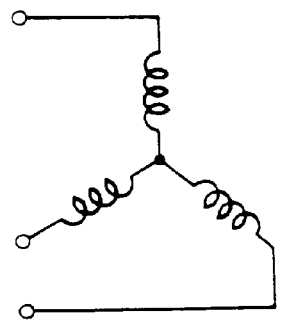
FIG. 5 is a connection circuit diagram of a drive coil of the linear motor.
Figure 3:
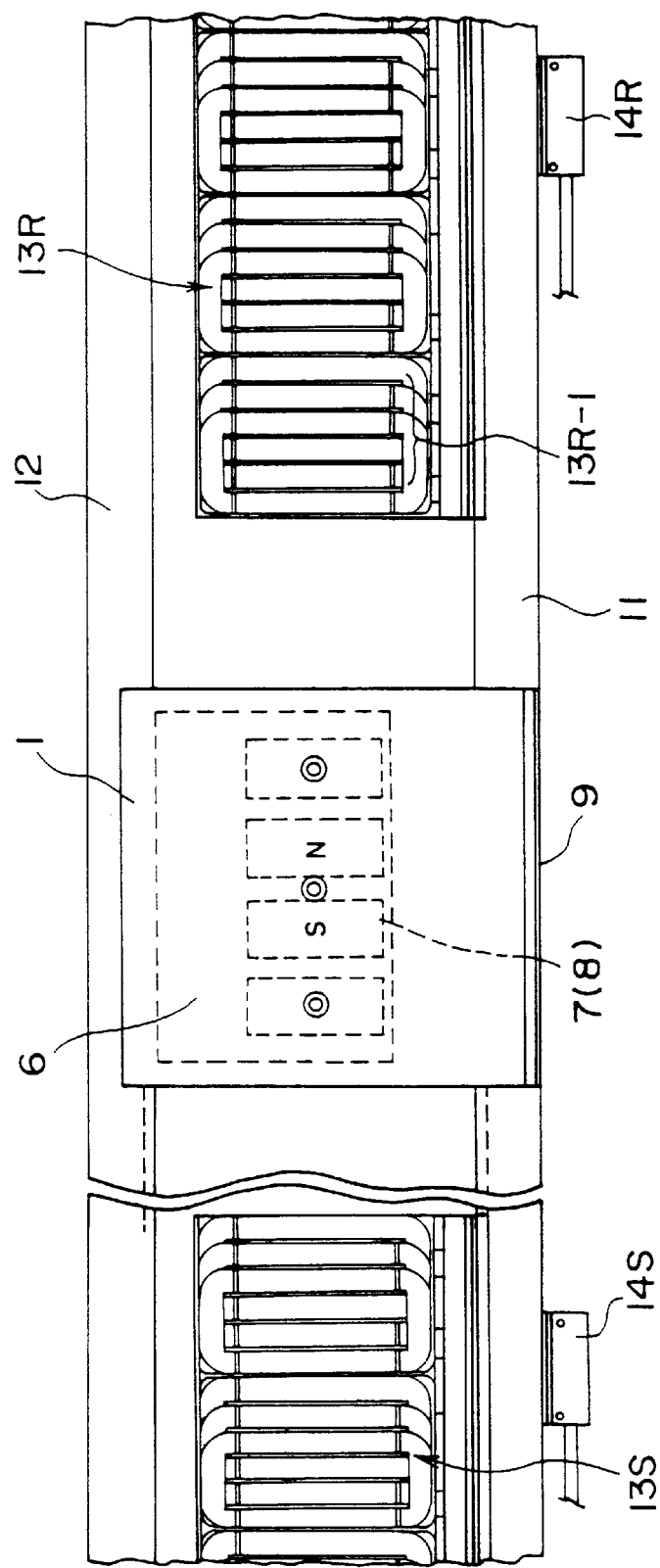
FIG. 3 is a top plan view of the linear motor.
Figure 4:
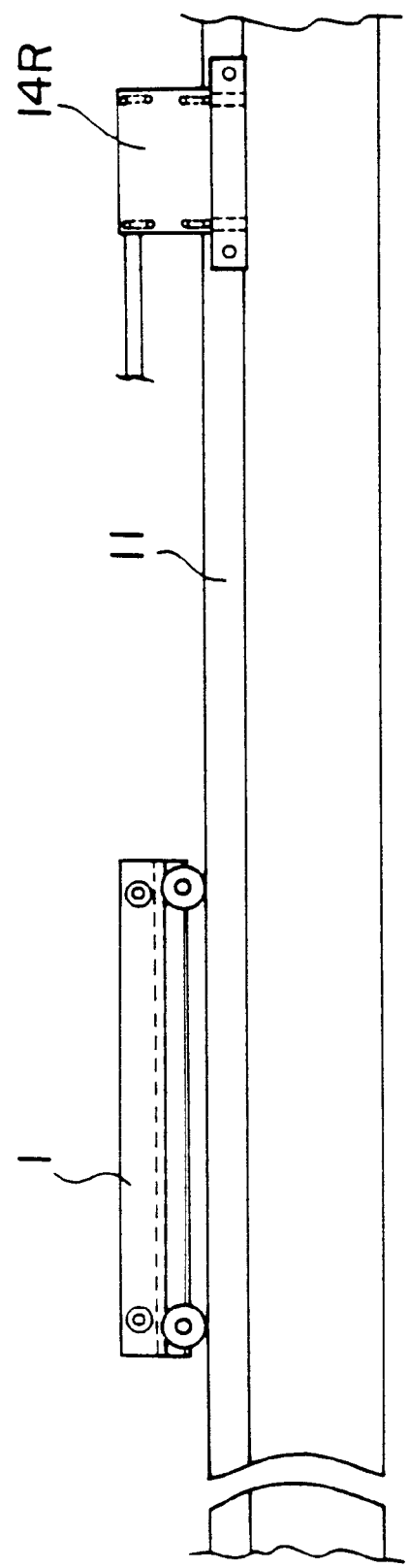
FIG. 4 is a front view of the linear motor.

The present invention will now be described in more detail with reference to the accompanying drawings. FIG. 1 is a block diagram showing an embodiment of a conveying system in accordance with the present invention and a graph for explaining the operation thereof; FIG. 2 is a side sectional view (a sectional view observed orthogonally in relation to a transit direction) showing the configuration of an embodiment of a linear motor used with the system in accordance with the present invention; FIG. 3 is a top plan view of the linear motor; FIG. 4 is a front view of the linear motor; and FIG. 5 is a connection circuit diagram of a drive coil of the linear motor.

A truck 1 loaded with articles to be conveyed (hereinafter referred to as "works") is provided on a passive moving assembly of a linear DC motor, and a linear scale 9 is provided on the moving assembly. The moving assembly is provided with a yoke 6 and permanent magnets 7 and 8 via a prop 1a, the permanent magnets 7 and 8 being positioned to sandwich a drive coil 13 with gaps maintained therebetween at a station to be discussed hereinafter.

The moving assembly is able to move by the guidance of rails 11 and 12 (see FIGS. 2 and 3) via ball bearings 2, 3, 4, and 5. The ball bearings 2 and 5 roll in contact with the top surfaces of the rails 11 and 12, while the ball bearings 3 and 4 roll in contact with the inner surfaces of the rails 11 and 12. The rails 11 and 12 are fixed to an enclosure 10. As shown in FIG. 1, in association with the rails, a sending drive coil 13S is disposed at a sending station S, and a receiving drive coil 13R is disposed at a receiving station R located at a position away from the sending station S by a predetermined distance.

Each station has contactless sensors for detecting the linear scale of the moving assembly. A photoelectric detector having a light emitting element and a light receiving element inserted in sensor heads 14S and 14R are used in the embodiment. When the sensor is used primarily only for acquiring the information for stop position control, the contactless sensors have to be disposed only at the receiving station R. The combination of the scale and the contactless sensor may be alternatively replaced by the combination of a magnetic scale and a magnetic sensor. In other words, it is important that the contactless design prevents generation of dust.

The sending and receiving drive coils 13S and 13R are driven by servo drivers 20 and 21, respectively. Connected to the respective servo drivers 20 and 21 is the information regarding the moving assembly received from the sensor heads 14S and 14R. It is possible to configure the system so that the information regarding the moving assembly received from the sensor heads 14S and 14R is transmitted to a CPU 22 to process the information and feed it back in the form of a control signal to the servo drivers 20 and 21.

Control signal generating devices incorporated in the CPU 22 or the servo drivers 20 and 21 drive the drivers 20 and 21 to accelerate and carry out the moving assembly, and stop it at a predetermined position of the receiving station. In the present invention, a transit track is provided with a portion wherein the truck travels with no energization because providing the whole transit track with coils would waste electric power, considering the dimensional relationship between the coils and moving magnets over the distance from the sending coil 13S to the receiving coil 13R.

The relationship between the number of sets of coils and of magnets and the length of a linear scale depends on the design and cost of the unit. This embodiment uses four sets of magnets, and three or four sets of three-phase coils for both sending and receiving coils. FIG. 5 is the connection diagram of one three-phase coil. The drivers 20 and 21 are of the intelligent three-phase servo type. In the embodiment, a motion program including the setting, acceleration, deceleration, speed, travel distance, various gains, etc. of the motor and the linear scale necessary for the servo operation is stored in the memories of the drivers. The CPU 22 and the drivers are connected via, for example, a serial interface (RS-232C) to transmit a minimum of instructions including start, stop, etc.

The drive of the moving assembly will now be described.

In the state shown in FIG. 1, the moving assembly corresponds to the coil portion of the sending station S, while the linear scale 9 corresponds to the sensor head 14S. At this time, the driver (DRS) 20 is in a servo-ON state and ready for operation in response to an instruction received from the CPU. When an operating instruction is transmitted in that state, the driver (DRS) 20 accelerates as shown by the acceleration zone of FIG. 1 according to an operation pattern stored in the memory beforehand.

The driver (DRS) 20 is set such that it is switched to a servo-OFF state at the moment the sensor head 14S can no longer read a signal from the scale 9 as the truck of the moving assembly travels. Then, the truck of the moving assembly travels by itself along the rails with no energization, which is referred to as "non-energization travel zone". In the receiving coil 13R, the driver (DDR) 21 is switched to the servo-ON state at the moment the receiving sensor head 14R detects the scale 9 on the truck when the truck of the moving assembly reaches. Under this condition, a signal from the scale 9 is read.

An operative example will now be described. A linear scale having a resolution of 1 to 10 $\mu$m is used, and the sending travel speed is set to 0.5 meter per second, and the receiving speed is set to 0.3 meter per second. When actual receiving speed is read from the sensor head for about 10 pulses and calculated, if it is assumed that the speed is 0.2 meter per second, then the measurement time ranges from 0.5 ms to 5 ms (the travel distance over the time ranges from 5 to 100 $\mu$m). Correcting the set receiving speed to increase immediately following the calculation allows smooth receiving of the truck with no abrupt change in speed. When the speed of the truck reaches the set receiving speed, the servo control mode is engaged and positioning at a preprogrammed point is performed. The positioning point can be arbitrarily set by programming.

In the foregoing embodiment, an example wherein the moving assembly travels from the left to the right as illustrated in FIG. 1; the travel direction, however, can be reversed by modifying the control program. Likewise, the acceleration, the travel speed, and positioning can be changed by reprogramming to change the non-energization travel distance. The conveying system employing the linear motor in accordance with the present invention enables an assembly line to be constructed by disposing a plurality of sending and receiving drive coils described above. Moreover, after the moving assembly is received and stopped at the receiving station, the moving assembly can be intermittently moved for further positioning. The moving assembly can also be returned to the sending station from the receiving station.

As previously mentioned, the relationship between the number of sets of coils and of magnets and the length of a linear scale depends on the design and cost of the unit. This embodiment uses four sets of magnets, and three or four sets of three-phase coils for both sending and receiving coils; obviously, however, other configurations are also possible. The drivers are the intelligent three-phase servo type, and the motion program including the setting, acceleration, deceleration, speed, travel distance, various gains, etc. of the motor and the linear scale necessary for the servo operation is stored in the memories of the drivers. These parameters can be integrally controlled using a control device.

Thus, the present invention permits easy control of positioning at a desired point, which has been difficult in conventional conveying systems. In the conveying operation, a sudden change in speed can be inhibited to permit smooth operation by measuring the speed of the truck at a point when the truck reaches a receiving zone after it is sent out and travels through the self-propelling zone so as to correct a preset speed on the receiving side for achieving synchronization. The use of the conveying system that employs the linear motor in accordance with the present invention makes it possible to construct an assembly line.

What is claimed is:

1. A conveyor system, comprising:

a linear motor;

a passive moving assembly connected to said linear motor, and loaded with an article to be conveyed;

a linear or magnetic scale provided on said moving assembly;

a rail for guiding said moving assembly;

a sending drive coil disposed at a sending station associated with said rail;

a first contactless sensor is disposed at said sending station and said first sensor detects said scale;

a receiving drive coil disposed at a receiving station associated with said rail, which is positioned away from said sending station;

a second contactless sensor which is disposed at least at said receiving station and which detects said scale;

drivers for driving said sending and receiving drive coils; and control means, to which information regarding the moving assembly from said sensors is connected and to which information the control means is responsive, and said control means being configured to drive said drivers to accelerate and send said moving assembly, thereby achieving non-energization travel, then to decelerate and stop at a predetermined position at the receiving station following non-energization travel.

2. A conveying system according to claim 1, wherein said moving assembly has a permanent magnet, and said linear motor is a linear DC motor.

3. A conveying system according to claim 1, wherein a combination of said scale and said contactless sensors is a combination of a linear scale and a photoelectric sensor, or a combination of a magnetic scale and a magnetic sensor.

4. A conveying system according to claim 1, wherein said control means is configured to cause said driver to send said moving assembly at a predetermined sending speed that matches a load of the moving assembly and a length of a non-energized travel passage.

5. A conveying system according to claim 2, wherein said control means reads said linear scale by said sensor after said moving assembly is received at the receiving station to detect the speed of said moving assembly, compares the detected speed with a reference receiving speed, and corrects the speed of said moving assembly so as to position and stop said moving assembly at a predetermined position.

6. A conveying system according to claim 1, wherein said sending station and said receiving station are provided with identical sending and receiving functions, and operated by said control means, and said control means including a central processing unit.

7. A conveying system according to claim 1, wherein a plurality of said sending and receiving drive coils are disposed to construct an assembly line.

8. A conveying system according to claim 1, wherein said moving assembly is configured to be intermittently moved for positioning after said moving assembly is received and stopped at said receiving station.

9. A conveying system according to claim 1, wherein said moving assembly is returned from said receiving station to said sending station.

* * * * *